United States Patent [19]

Kallin et al.

[11] Patent Number: 5,119,502

[45] Date of Patent: Jun. 2, 1992

[54] PERIODIC SYSTEM ORDERED RESCAN IN A CELLULAR COMMUNICATION SYSTEM

[75] Inventors: Harald Kallin, Sollentuna; Roland S. Bodin, Spanga, both of Sweden

[73] Assignee: Telefonaktiebolaget L M Ericsson, Stockholm, Sweden

[21] Appl. No.: 574,774

[22] Filed: Aug. 30, 1990

[51] Int. Cl.⁵ .......................... H04B 7/26; H04Q 7/00
[52] U.S. Cl. ....................... 455/34.2; 455/70; 455/56.1; 455/161.3
[58] Field of Search .................... 455/31-34, 455/38, 54, 56, 62, 68, 70, 71, 151, 160, 161, 166; 340/825.03, 825.44, 825.54, 825.1, 825.11, 825.12, 825.13; 379/59, 60, 63

[56] References Cited

U.S. PATENT DOCUMENTS

| | | | |
|---|---|---|---|
| H610 | 3/1989 | Focarile et al. | 379/60 |
| 4,399,555 | 8/1983 | MacDonald et al. | 455/33 |
| 4,597,104 | 6/1986 | Ohki et al. | 455/32 |
| 4,670,906 | 6/1987 | Thro | 455/56 |
| 4,775,999 | 10/1988 | Williams | 379/59 |
| 4,905,301 | 2/1990 | Krolopp et al. | 455/34 |

Primary Examiner—Reinhard J. Eisenzopf
Assistant Examiner—Chi H. Pham
Attorney, Agent, or Firm—Burns, Doane, Swecker & Mathis

[57] ABSTRACT

A method for use in a cellular radio telephone system for controlling, in at least one mobile station, rescanning operations of paging channels in the system, wherein the mobile station is operationally connected to at least one base station. The method involves broadcasting a rescan message from the base station to the mobile station at predetermined intervals during operation of the base station. Pages to be sent to the mobile stations are stored immediately following broadcast of the rescan message until such time as all mobile stations have had an adequate opportunity to carry out the rescanning operation.

18 Claims, 5 Drawing Sheets

PERIODIC SYSTEM ORDERED RESCAN IN A CELLULAR COMMUNICATION SYSTEM

FIELD OF THE INVENTION

The present invention relates to cellular mobile radio systems. More particularly, the present invention is directed to a method and apparatus for controlling the rescanning of the paging channels in such systems.

BACKGROUND OF THE INVENTION

A typical cellular mobile radio telephone system is controlled by at least one mobile switching center (also known as a mobile telephone switching office), at least one base station, and at least one mobile station. The mobile switching center constitutes an interface between the radio system and the public switching telephone network. The base station transmits information between the mobile stations and the mobile switching centers. Calls to and from mobile subscribers are switched by the mobile switching center. The mobile switching center also provides all signalling functions needed to establish the calls. In order to obtain radio coverage of a geographical area, a number of base stations are normally required. This number may range from, in the exceptional case, one base station, up to one hundred or more base stations in normal systems. The area is divided into cells, where each cell may either be serviced by a base station or may share a base station with a number of other cells. Each cell has an associated control channel over which control (nonvoice) information is communicated between the mobile units in that cell and the base station. Generally speaking, the control channel includes a dedicated channel at a known frequency over which certain information is communicated from the base station to mobile stations, a paging channel for unidirectional transmissions of information from the base station to the mobile stations, and an access channel for bidirectional communications between the mobile stations and the base station. These various channels may share the same frequency, or they may operate at different respective frequencies.

Three types of transmissions normally take place on the control channels between the mobile stations and the base stations. First, when a mobile station is originating a call, it sends an access request to the base station whose control channel has the strongest signal. This access request serves to inform the base station that the requesting mobile station needs to be assigned a voice channel over which the call can be connected. Second, when a mobile station is paged by a base station over the paging channel, indicating that the base station has a call to be completed to the mobile subscriber, the paged mobile station sends back a paging response on the access channel. Finally, when a mobile station travels from one cell to another, or for other reasons, the mobile station may send a registration access over the access channel to identify itself and its presence to the telephone exchange associated with the cell.

A mobile station in an idle state, i.e. with no active call taking place, will listen for pages and other information on the paging channel having the strongest signal strength. The mobile station will stay tuned to the paging channel until it either initiates an access, e.g. a registration, call access or paging response, or performs a rescan of all the paging channels within its range to determine if a new paging channel has a stronger signal strength than the current paging channel.

In conventional systems, there are three main reasons why an idle mobile station rescans the paging channel: loss of data, mobile station autonomous rescan, or a system message. Each of these is discussed below.

Regarding loss of data, the Total Access Communication System (TACS) standard, used mostly in the United Kingdom and China, indicates that if data cannot be correctly decoded for 5 seconds, the mobile station must rescan the paging channels. The Advanced Mobile Phone Service, Inc. (AMPS) specification, published by AT&T in 1983, indicates that a rescan must be done if five consecutive word synchronization sequences are received in error.

Regarding autonomous mobile station rescan, the AMPS standard specifies that each mobile station should have a rescan timer of five minutes which is reset every time the mobile station performs a rescan. When this timer times out, the mobile station carries out a rescan of the paging channels.

The third reason for a mobile station to rescan is if the system sends a rescan message in the Global Action Overhead Message—GAOM. When this message is received, all mobile stations receiving the message will rescan and select the paging channel with the strongest signal strength. This message could be sent, for example, from a base station immediately before it is shut down, due to, for example, hardware problems, or temporary maintenance. This would cause the mobile stations locked to the paging channel associated with the closing base station to lock onto the paging channels of surrounding cells instead.

In cellular radio systems, since the mobile station may move, the quality of the received signal may deteriorate if the mobile station leaves the base station's coverage area. As the quality of the received signal is reduced, the ability to correctly detect and interpret data messages is also reduced. This decreases the probability of, for example, receiving incoming calls.

By performing a rescan of all paging channels (which might be 21 channels, for example) and selecting the paging channel with the strongest signal strength, the word error rate of signals received at the mobile station may decrease, thereby increasing the probability of correctly receiving messages on the paging channel.

Because a rescan of the available paging channels normally takes a few seconds, an idle mobile station spends approximately at least one to two percent of its idle time doing rescans. During this time, the mobile station cannot respond to pages. In other words, at a given moment, a couple of percent of the idle mobile station population is not listening to the information sent from the system on the paging channel due to active rescans.

Another drawback associated with the need to use control channels in a cellular telephone system occurs when a mobile station locks onto one paging channel while traveling long distances (known as a sort of channel dragging). When the mobile station makes a system access the mobile station scans the access channels in order to select the strongest (which hopefully is the closest and/or the best to use) access channel. If the mobile station has rescanned the control channels recently, it is likely that the mobile station will choose the same control channel as the access channel with the strongest signal strength. If, on the other hand, the mobile station has moved a distance since the last rescan, chances are that the mobile station will choose another control channel as the access channel. The access channel may, in the worst case, belong to another system, another operator, and even another country. In most cases where problems develop, the access channel belongs to some system where the mobile station is not recognized as an authorized user of the system.

The unexpected access can lead to failure to complete the call as dialed or failure to connect the mobile station to the calling subscriber. If the mobile station would have discovered it had moved into another system and registered there, the newly entered system could then have more easily handled calls to and from this mobile station.

SUMMARY OF THE INVENTION

In order to reduce the probability of lost calls due to the above-described situations, the present invention is directed to a method for use in a cellular radio telephone system for controlling rescanning operations of paging channels. According to the invention, a rescan message is broadcast from the base station to the mobile stations at predetermined intervals. In an exemplary embodiment of the invention, these intervals can be about two minutes apart.

According to another embodiment of the present invention, a method is provided for use in a cellular radio telephone system for selecting an optimal paging channel for a mobile station. A rescan message is broadcast from the base station to the mobile station at predetermined intervals less than the period of autonomous rescan by the mobile stations. The mobile stations rescan a plurality of paging channels and select a paging channel having the strongest signal strength.

According to another embodiment of the present invention, an apparatus is provided for reducing incidents of lost calls and for improving quality of connections in the network of a cellular mobile telephone system. In the system, the base station orders a rescan operation for rescanning a plurality of paging channels at periodic intervals during operation of the base station. The mobile station receives the rescan operation message and performs a rescan of the plurality of paging channels. The mobile station selects an optimal paging channel in response to the rescan.

BRIEF DESCRIPTION OF THE DRAWINGS

The present invention will now be described in more detail with reference to preferred embodiments of the invention, given only by way of example, and illustrated in the accompanying drawings, in which.

DETAILED DESCRIPTION OF THE PREFERRED EMBODIMENTS

Before describing the details of the present invention, an example of the construction of a cellular mobile radio system in which the present invention can be used will be discussed.

Figure 1:
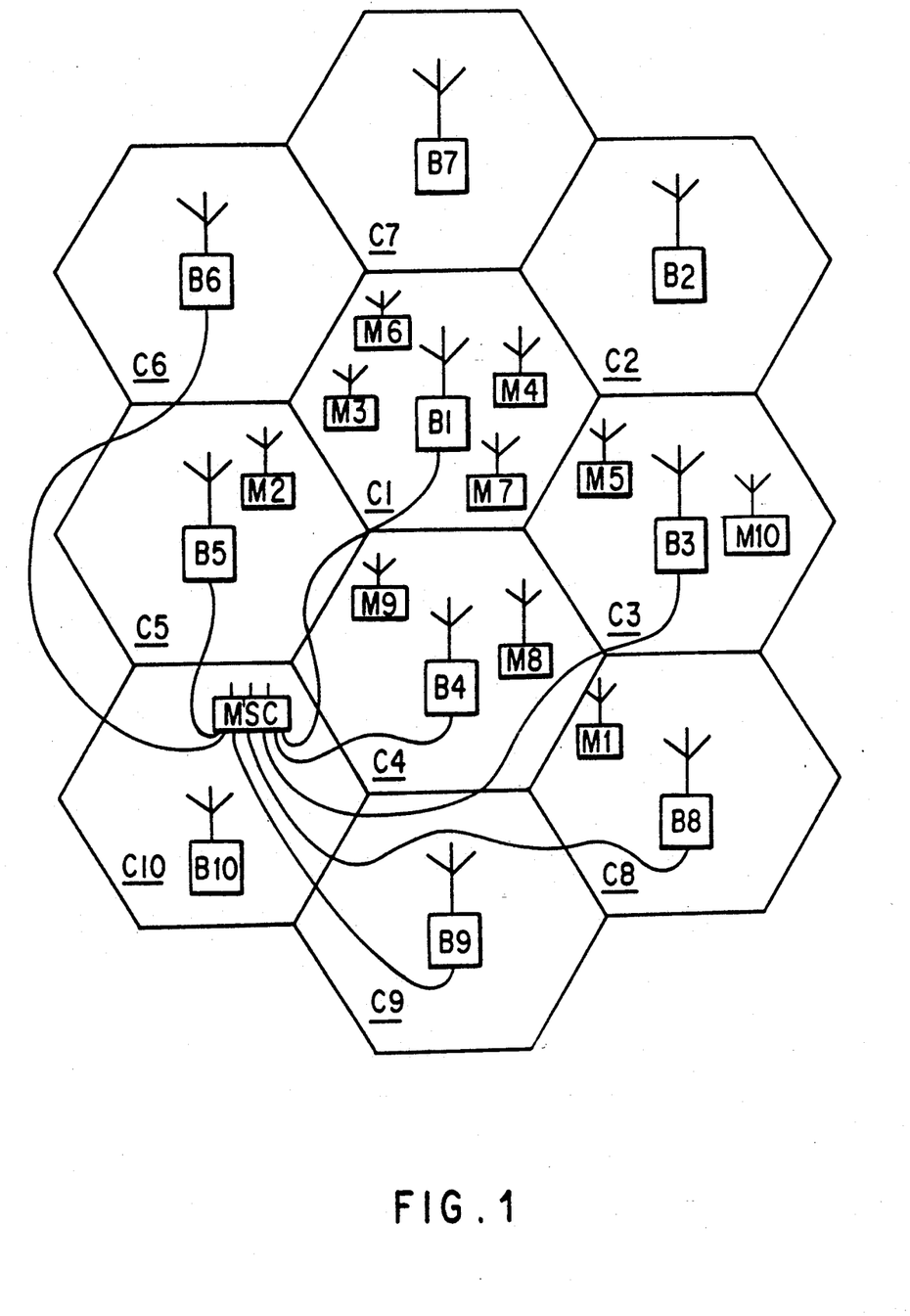
FIG. 1 is a schematic diagram illustrating an example of a cellular mobile radio system, illustrating the relationship of the system's cells, a mobile switching center, base stations and mobile stations.

FIG. 1 is a schematic diagram illustrating ten cells, C1 to C10, in a cellular mobile radio telephone system. Normally the method according to the present invention would be implemented in a cellular mobile radio system comprising many more cells than ten. For purposes of this discussion, the system depicted herein is considered to be an isolated portion of a larger system which has been fragmented.

For each cell C1 to C10, there is a respective base station B1 to B10. FIG. 1 illustrates base stations situated in the vicinity of the respective cell centers and having omni-directional antennas. The base stations of adjacent cells may however be collocated in the vicinity of cell borders and have directional antennas.

FIG. 1 also illustrates ten mobile stations M1 to M10, which are movable within a cell and from one cell to another cell. The method according to the present invention may be implemented in a cellular mobile radio system comprising many more mobile stations than ten. In particular, there are normally many more mobile stations than there are base stations.

Also illustrated in FIG. 1 is a mobile switching center. The mobile switching center MSC illustrated in FIG. 1 is connected to all ten illustrated base stations by cables. The mobile switching center is connected by cables also to a fixed public switching telephone network or similar fixed network with ISDN facilities. All cables from the mobile switching center to base stations and cables to the fixed network are not illustrated. Further, other media may be used instead of cables for base to mobile switching center communications, e.g., fixed radio links.

The cellular mobile radio system illustrated in FIG. 1 includes a plurality of radio channels for communication. The system is designed both for analog information, e.g., speech, digitized analog information, e.g., digitized speech, and pure digital information, e.g., pure digital data. In the context of the present invention, the term connection is used for a communication channel between a mobile station and another mobile station in the same system or another system, or between two fixed telephones or terminals in a fixed network connected through the cellular mobile radio telephone system. Thus a connection may be a call where two people talk to each other, but may also be a data communication channel where computers exchange data.

Each cellular system is assigned a particular frequency band over which it can operate. A set of communication channels is allocated to each cell. For example, between 10 and 30 different voice channels and 1 control channel may be allocated to any given cell. Different sets of communication channels must always be allocated to neighboring cells since, in order to maintain full radio coverage, cells overlap each other. Using the same channels in adjacent cells would cause co-channel interference in these overlapping areas.

Figure 2:
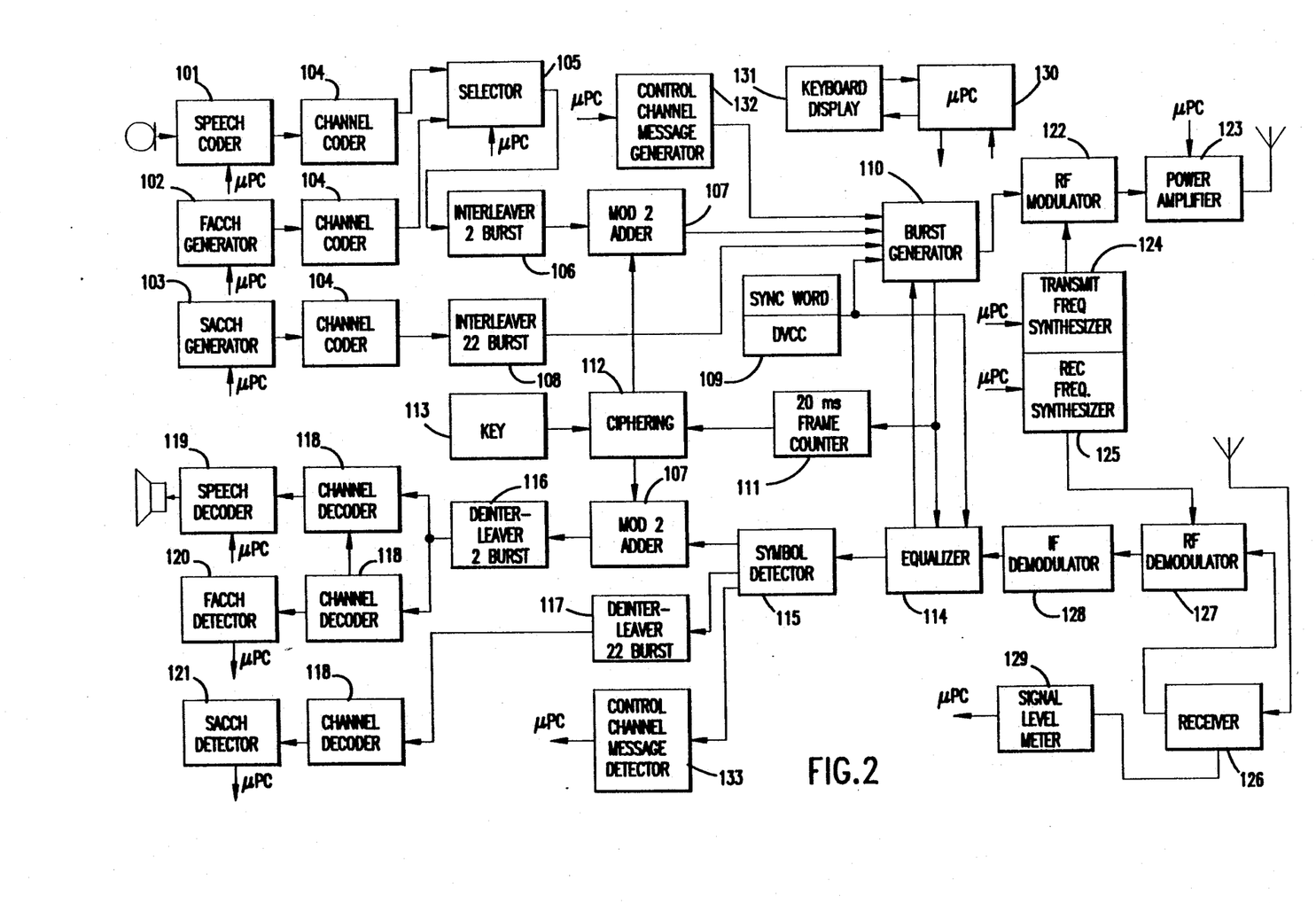
FIG. 2 is a block diagram illustrating a mobile station in a cellular mobile radio system according to FIG. 1.

Referring now to FIG. 2, an embodiment of a mobile station that can be utilized in a cellular telephone system that operates in accordance with the present invention is illustrated. This particular example pertains to a mobile station that can be used in a digital communications system, i.e. one in which digitized voice information is transmitted between base and mobile stations. Furthermore, the operation of the system is explained in the context of full-rate transmissions, in which each packet of digital information is interleaved over two spaced time slots in a frame of data. It will be readily appreciated, however, that the invention is equally applicable to other types of cellular radio systems, such as those in which information is transmitted in an analog format or transmitted digitally at a half rate.

In the mobile station depicted in FIG. 2, a speech coder 101 converts the analog signal generated by a microphone into a binary data stream. The data stream is then divided into data packets, according to the TDMA principle. A fast associated control channel (FACCH) generator 102 generates control and supervision signalling messages that are transmitted from the mobile station to the land-based system. The FACCH message replaces a user frame (speech/data) whenever it is to be transmitted. A slow associated control channel (SACCH) generator 103 provides signalling messages that are transmitted over a continuous channel for the exchange of information between the base station and the mobile station and vice-versa. A fixed number of bits, e.g. twelve, is allocated to the SACCH for each time slot of a message train. Channel coders 104 are respectively connected to the speech coder 101, FACCH generator 102, and SACCH generator 103 for manipulating the incoming data in order to carry out error detection and correction. The techniques used by the channel coders 104 are preferably convolutional encoding, which protects important data bits in the speech code, and cyclic redundancy check (CRC), wherein the perceptually significant bits in the speech coder frame, e.g. twelve bits, are used for computing a seven-bit check.

A selector 105 is connected to the channel coders 104 associated with the speech coder 101 and the FACCH generator 102, respectively. The selector 105 is controlled by a microprocessor controller 130 so that, at appropriate times, user information over a particular speech channel is replaced with system supervision messages over the FACCH. A two-burst interleaver 106 is coupled to the output of the selector 105. Data to be transmitted by the mobile station is interleaved over two distinct time slots. A packet of 260 data bits, which constitute one transmitting word, are divided into two equal parts and are interleaved over two different time slots. The effects of RAYLEIGH fading will be reduced in this manner. The output of the two-burst interleaver 106 is provided to the input of a modulo-two adder 107 so that the transmitted data is ciphered bit-by-bit by logical modulo-two-addition of a pseudo-random bit stream.

The output of the channel coder 104 associated with the SACCH generator 103 is connected to a 22-burst interleaver 108. The 22-burst interleaver 108 interleaves data transmitted over the SACCH over 22 time slots each consisting of 12 bits of information.

The mobile station further includes a Sync Word/DVCC generator 109 for providing the appropriate synchronization word (Sync Word) and DVCC (digital verification color code) which are to be associated with a particular connection. The Sync Word is a 28 bit word used for time slot synchronization and identification. The DVCC is an 8-bit code which is sent by the base station to the mobile station and vice-versa, for assuring that the proper channel is being decoded.

A burst generator 110 generates message bursts for transmission by the mobile station. The burst generator 110 is connected to the outputs of the modulo-two-adder 107, the 22-burst interleaver 108, the Sync Word/DVCC generator 109, an equalizer 114, and a control channel message generator 132, to integrate the various pieces of information from these respective units into a single message burst. For example, according to the published U.S. standard EIA/TIA 15-54, a message burst comprises data (260 bits), SACCH (12 bits), Sync Word (28 bits), coded DVCC (12 bits), and 12 delimiter bits, combined for a total of 324 bits. Under the control of the microprocessor 130, two different types of message bursts are generated by the burst generator 110: control channel message bursts from the control channel message generator 132 and voice/traffic message bursts. The control channel message replaces the SACCH as well as the speech data normally generated in a voice/traffic burst.

The transmission of a burst, which is equivalent to one time slot, is synchronized with the transmission of other time slots, which together make up a frame of information. For example, under the U.S. standard, a frame comprises three full-rate time slots. The transmission of each burst is adjusted according to timing control provided by the equalizer 114. Due to time dispersion, an adaptive equalization method is provided in order to improve signal quality. For further information regarding adaptive equalization techniques, reference is made to U.S. patent application Ser. No. 315,561, filed Feb. 27, 1989, and assigned to the same assignee. Briefly, the base station functions as the master and the mobile station is the slave with respect to frame timing. The equalizer 114 detects the timing of an incoming bit stream from the base station and synchronizes the burst generator 110. The equalizer 114 is also operable for checking the Sync Word and DVCC for identification purposes.

A frame counter 111 is coupled to the burst generator 110 and the equalizer 114. The frame counter 111 updates a ciphering code utilized by the mobile station for each transmitted frame, e.g. once every 20 ms. A ciphering unit 112 is provided for generating the ciphering code utilized by the mobile station. A pseudo random algorithm is preferably utilized. The ciphering unit 112 is controlled by a key 113 which is unique for each subscriber. The ciphering unit 112 consists of a sequencer which updates the ciphering code.

The burst produced by the burst generator 110, which is to be transmitted, is forwarded to an RF modulator 122. The RF modulator 122 is operable for modulating a carrier frequency according to the $\pi/4$-DQPSK method ($\pi/4$ shifted, Differentially encoded Quadrature Phase Shift Keying). The use of this technique implies that the information is differentially encoded, i.e., 2-bit symbols are transmitted as four possible changes in phase; $\pm\pi/4$ and $\pm 3\pi/4$. The transmitter carrier frequency supplied to the RF modulator 122 is generated by a transmitting frequency synthesizer 124 in accordance with the selected transmitting channel. Before the modulated carrier is transmitted by an antenna, the carrier is amplified by a power amplifier 123. The RF power emission level of the amplifier is selected on command by a microprocessor controller 130.

A receiver carrier frequency signal is generated in accordance with the selected receiving channel by a receiving frequency synthesizer 125. Incoming radio frequency signals are received by a receiver 126, the strength of which are measured by a signal level meter 129. The received signal strength value is then sent to the microprocessor controller 130. An RF demodulator 127, which receives the receiver carrier frequency signal from the receiving frequency synthesizer 125 and the radio frequency signal from the receiver 126, demodulates the radio frequency carrier signal, thus generating an intermediate frequency. The intermediate frequency signal is then demodulated by an IF demodulator 128, which restores the original $\pi/4$-DQPSK-modulated digital information.

The restored digital information provided by the IF demodulator 128 is supplied to the equalizer 114. A symbol detector 115 converts the received two-bit symbol format of the digital data from the equalizer 114 to a single-bit data stream. The symbol detector 115 in turn produces three distinct output signals. Control channel messages are sent to a control message detector 133 which supplies detected control channel information to the microprocessor controller 130. Any speech data/FACCH data is supplied to a modulo-two adder 107 and a two-burst deinterleaver 116. The speech data/FACCH data is reconstructed by these components by assembling and rearranging information from two time slots of the received data. The symbol detector 115 supplies SACCH data to a 22-burst deinterleaver 117. The 22-burst deinterleaver 117 reassembles and rearranges the SACCH data, which is spread over 22 consecutive frames.

The two-burst deinterleaver 116 provides the speech data/FACCH data to two channel decoders 118. The convolutionally encoded data is decoded using the reverse of the above-mentioned coding principle. The received cyclic redundancy check (CRC) bits are checked to determine if any error has occurred. The FACCH channel coder furthermore detects the distinction between the speech channel and any FACCH information, and directs the decoders accordingly. A speech decoder 119 processes the received speech data from the channel decoder 118 in accordance with a speech coder algorithm (e.g. VSELP), and generates the received speech signal. The analog signal is finally enhanced by a filtering technique. Messages on the fast associated control channel are detected by a FACCH detector 120, and the information is transferred to the microprocessor controller 130.

The output of the 22-burst deinterleaver 117 is provided to a separate channel decoder 118. Messages on the slow associated control channel are detected by a SACCH detector 121, and that information is transferred to the microprocessor controller 130.

The microprocessor controller 130 controls the mobile station activity and the base station communication, and also handles the terminal keyboard input and display output 131. Decisions by the microprocessor controller 130 are made in accordance with received messages and measurements that are made. The keyboard and display unit 131 enable information to be exchanged between the user and the base station.

Figure 3:
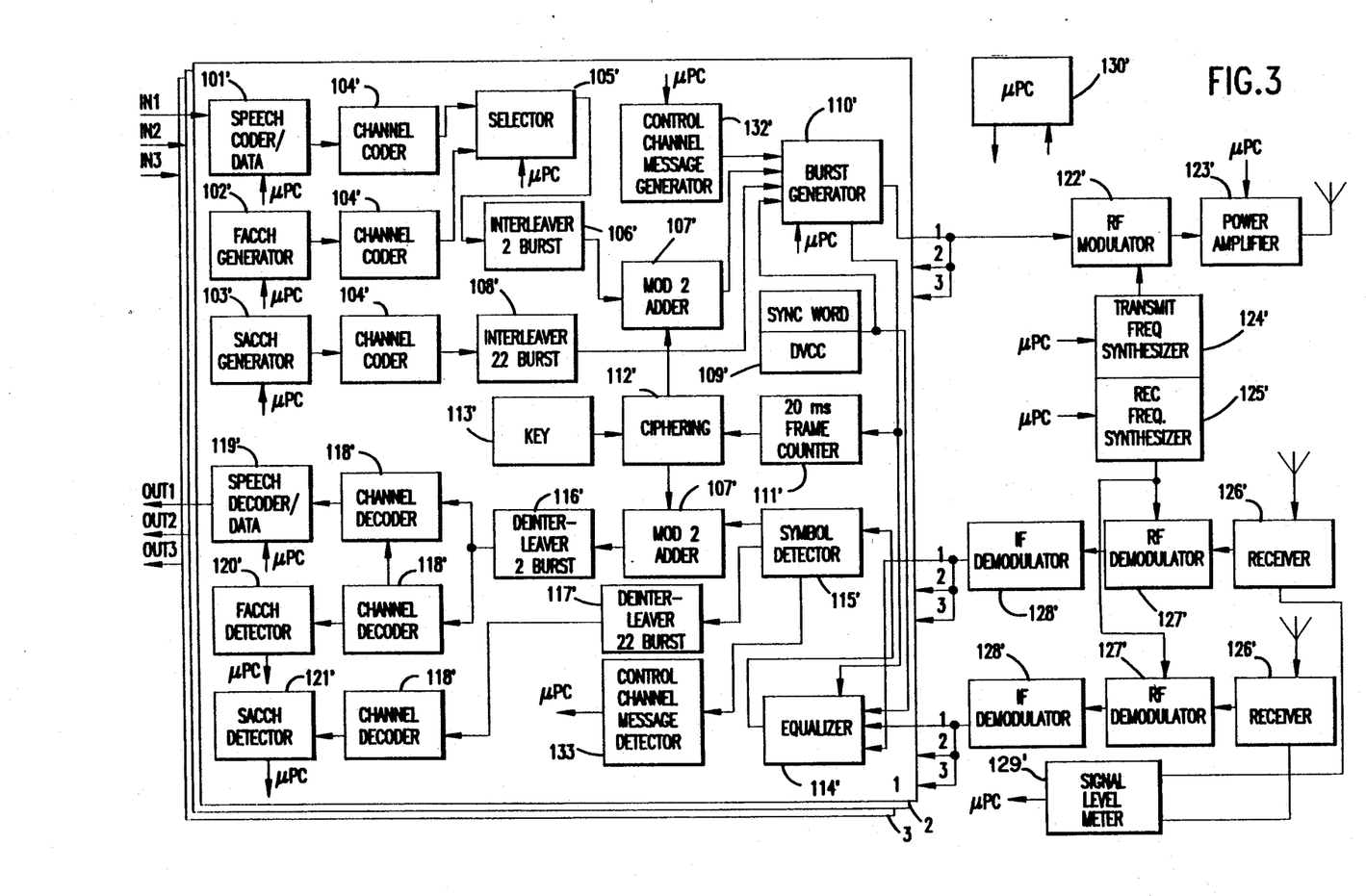
FIG. 3 is a block diagram illustrating a base station in a cellular mobile radio system according to FIG. 1.

FIG. 3 illustrates an embodiment of a base station that can be utilized in a cellular telephone system that operates in accordance with the present invention. The base station incorporates numerous component parts which are substantially identical in construction and function to component parts of the mobile station illustrated in FIG. 2 and described in conjunction therewith. Such identical component parts are designated in FIG. 3 with the same reference numerals utilized hereinabove in the description of the mobile station, but are differentiated therefrom by means of a prime (') designation.

There are, however, some distinctions between the mobile and base stations. For instance, the base station has two receiving antennas. Associated with each of these receiving antennas are a receiver 126', an RF demodulator 127', and an IF demodulator 128'. Furthermore, the base station does not include a user keyboard and display unit 131 as utilized in the mobile station.

When power is applied to the mobile station, the microprocessor controller 130 executes an initialization procedure. Initially, the serving system parameters are retrieved, meaning that the preferred system, e.g., A or B (wireline or non-wireline), is selected. Depending on the choice made, scanning is carried out over the dedicated control channels belonging to the preferred system.

The receiving frequency synthesizer 125 is controlled by the microprocessor controller 130 to generate the frequency which corresponds to the first dedicated control channel. When the frequency is stable, the signal level meter 129 measures the signal strength, and thereafter the microprocessor controller 130 stores the signal strength value. This same procedure is performed for the frequencies corresponding to the remaining dedicated control channels, and a ranking based on the signal strength of each is made by the microprocessor controller 130. The receiving frequency synthesizer 125 is then tuned to the frequency with the highest signal strength level so that the mobile station can attempt to synchronize to that channel.

The radio signal is captured by the receiver 126 and is demodulated according to the selected carrier frequency by the RF modulator 127, and then demodulated by the IF demodulator 128. Synchronization and primary analysis of the digital information in the radio signal is made in the equalizer 114. If the equalizer 114 detects a Sync Word identical to the Sync Word stored in Sync Word generator 109, the equalizer 114 will lock to the time slot associated with that Sync Word. The mobile station waits for the system parameter overhead message decoded by the channel decoder 118 and transferred to the microprocessor controller 130. This message contains information about the identification of the system, the protocol capability, the number of available paging channels and their specific frequency allocation.

In the situation where the equalizer 114 does not recognize the Sync Word within a specified period of time, the receiving frequency synthesizer 125 is ordered by the microprocessor controller 130 to tune to the channel with the next strongest signal. If the mobile station is unable to synchronize at this second choice, the microprocessor controller 130 orders a change of the preferred systems, e.g., from A to B or vice versa, etc. Thereafter, the scanning of the dedicated control channels of the new preferred system will begin.

When the mobile station has received the system parameter overhead message, the paging channels are scanned in the same manner as the dedicated control channels, i.e., by measuring the signal strength and selecting the frequency with the strongest signal. Synchronization to the paging channels is then performed accordingly.

Upon successful synchronization on a paging channel, the mobile station leaves the initialization procedure and enters into an idle mode. The idle mode is characterized by four main states, which are controlled by the microprocessor controller 130, and which are sequentially looped through as long as no access to the system is initiated.

The first state associated with the idle mode is a continuous updating of the mobile station status, e.g., the number of and the location of existing access channels. This information is carried to the mobile station in the system parameter overhead message on the paging channel. This message is decoded in the channel decoder 118 and sent to the microprocessor controller 130. Certain messages transmitted from the base station in the system parameter overhead message demand responding actions from the mobile station, e.g., a rescan message orders the microprocessor controller 130 to restart the initialization procedure. As another example, a registration identity message from the base station may force the mobile station to make a system access in order to register in accordance with the system access mode described hereinbelow.

The second state associated with the idle mode relates to the situation where the mobile station attempts to match page messages transmitted by the base station. These mobile station control messages, which are sent over the paging channel, are decoded in the control channel message detector 133 and analyzed by the microprocessor controller 130. If the decoded number matches the identification number of the mobile station, a connection to the base station will be prepared in the system access mode.

The third state of the idle mode involves listening to orders sent by the base station over the paging channel. Decoded orders, such as an abbreviated alert, will be processed by the mobile station accordingly.

The fourth state in the idle mode involves the microprocessor controller 130 supervising the input from keyboard 131 for user activity, e.g., call initiating. A call origination results in the mobile station leaving the idle mode and starting the system access mode.

One of the primary tasks performed in the system access mode of the mobile station is the generation of an access message in the mobile station and preparation of a suitable traffic channel for information exchange. The access channels available to the mobile, which were updated during the idle mode, are examined in a manner similar to the measuring of the dedicated control channels as previously described. A ranking of the signal strength of each is made, and the channel associated with the strongest signal is chosen. The transmitting frequency synthesizer 124 and the receiving frequency synthesizer 125 are tuned accordingly, and a service request message is sent over the selected channel in order to inform the base station about the type of access wanted, e.g., call origination, page response, registration request or order confirmation. After completion of this message, the amplifier 123 of the mobile station is turned off and the mobile station may wait for further control messages. Depending on the access type, the mobile station will then receive an adequate message from the base station.

If the access type is origination or paging, the mobile station is assigned a free traffic channel by the base station, and the mobile station takes over the control of the traffic channel and leaves the system access mode. The mobile station then tunes the transmitting frequency synthesizer 124 and the receiving frequency synthesizer 125 to the frequencies associated with the chosen traffic channel. Thereafter, the equalizer 114 starts synchronizing. A time alignment procedure is controlled by the base station and is based on time delay measurements which are performed at the base station on the received signal. From this moment on, the exchange of messages between the base station and the mobile station are transferred over the fast associated control channel (FACCH) and the slow associated control (SACCH).

Messages from the microprocessor controller 130 are generated by the FACCH generator 102 or the SACCH generator 103, and data is error protection coded in the channel coder 104. The FACCH data is time multiplexed with speech data in the multiplexer 105, and interleaved over two bursts by the two-burst interleaver 106. The data is then encrypted in the modulo-2 adder 107, which is controlled by the ciphering algorithm generated by the ciphering unit 112. The SACCH data is interleaved over 22 bursts by the 22-burst interleaver 108, and is then supplied to the burst generator 110 where the SACCH data is mixed with speech data, FACCH data, the Sync Word, and the DVCC from DVCC generator 109 to form a data burst. The RF modulator 122 modulates the bit pattern according to the $\pi/4$-DQPSK principle. The power amplifier 123 is activated, and the power level is controlled by the microprocessor controller 130 during the time of the transmitted slot.

Control messages from the base station to the microprocessor controller 130 of the mobile station are also transferred via the FACCH and SACCH. The symbol detector 115 converts the received four-symbol pattern to a bit data stream which is directed to the speech decoder 119, FACCH detector 120, or SACCH detector 121, depending on the type of data received. Speech data and FACCH data are decrypted by the modulo-2 adder 107, and the two-burst deinterleaver 116. The channel decoders 118 detect bit errors and inform the microprocessor controller 130 accordingly. The SACCH is deinterleaved over 22 bursts by the 22-burst deinterleaver 117 before error detection is carried out in the channel decoder 118.

Messages transmitted from the base station to the mobile station typically include alerting orders, requests to perform channel quality measurements, release call, and handoff orders. Messages transmitted in the opposite direction are those initiated by the mobile station user, e.g. the release order. The last order implies that the user is finished with the call, and the mobile station will release control of the traffic channel and return to the initialization mode of operation.

As noted above, the method of the present invention involves transmitting a rescan message periodically to order the mobile stations to rescan the paging channels, preferably with greater frequency than was done in conventional systems. With such an approach, it is possible to achieve several improvements in mobile station and system behavior.

First, a periodic rescan message assures that the mobile station is tuned to a paging channel with good or acceptable quality for as large a portion of the time as is possible. This increases mobile station availability and controllability.

Secondly, a periodic rescan message reduces the penetration depth into other systems (reduces the channel dragging) and hence, lessens the exposure time when a mobile station has entered a new system area without being registered there. This improves mobile station and system performances at system borders.

Finally, the rescan message is preferably sent from the base station with a periodicity less than the autonomous rescan timer's time-out. For example, if each mobile station's rescan timer is set to time out after five minutes, the system ordered rescan message can be transmitted at intervals of less than five minutes. With this approach, all rescans will take place under the control of the land-based system, rather than autonomously from the individual mobile stations. Organizing and/or synchronizing the rescans from the system rather than letting the mobile station decide when to rescan makes it possible to queue paging messages after a rescan message has been sent. With the autonomous rescan of current systems, some percentage of the mobile stations are rescanning at any given time which means they cannot receive pages, i.e., pages have to be repeated or calls are lost.

When the rescan message is sent more often than every five minutes, the system knows all mobile stations are rescanning and there is little or no use transmitting any paging messages for the time it takes a mobile station to carry out a rescan, e.g. a few seconds, after the rescan message was sent. If these paging messages are queued or buffered and sent out a few seconds later, no calls will be lost due to the need for paging channel rescanning. This increases the number of successfully completed calls.

Figure 4:
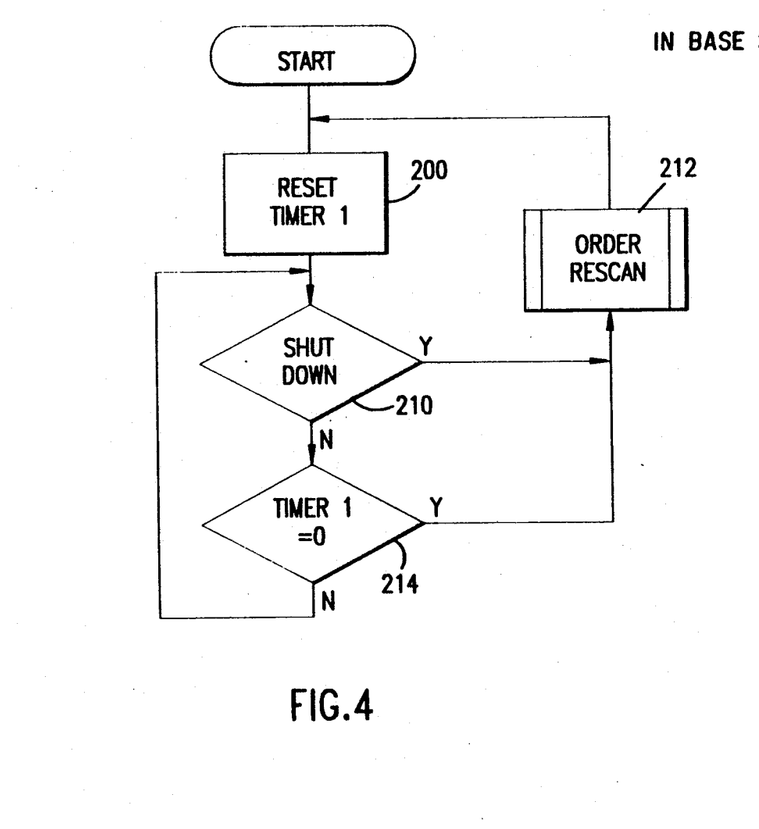
FIG. 4 is a flowchart illustrating the main routine performed by the base stations according to the present invention.

The operation of a cellular mobile radio system in accordance with the principles of the present invention will now be described in greater detail with reference to the flow charts of FIGS. 4-6. FIG. 4 is a flowchart which illustrates the routine carried out by the base stations in the cellular system. The routines which implement the present invention are stored in and run by the microprocessor controller 130'. At step 200, a timer, TIMER1, is initialized. This timer is used to determine how often the base station will transmit the rescan message to idle mobile stations.

In an exemplary embodiment of the present invention, this timer is set to 2 minutes. However, the particular period of time can vary from cell to cell, i.e. from one control channel to the next, depending on factors such as the size of the cell. For smaller cells, the rescan message is preferably sent more frequently, since a mobile station is more likely to move from a small cell quicker than from a larger cell. Additionally, it may be desirable to order rescan more frequently in cells which are associated with high-speed traffic areas and less frequently in cells containing lower speed traffic, such as those in the center of a city. In any event, the time period is less than the time-out set for autonomous rescan operations by the mobile stations, according to any applicable standards.

At step 210, a determination is made as to whether the base station is about to shut down, for example, for routine maintenance or repairs. If so, the rescan message routine is called, at step 212. If not, step 214 determines whether TIMER1 has expired. If so, the rescan message routine is called, and the timer is reset at step 200. This main routine does not end, since the base station continuously monitors whether rescan messages should be sent.

Figure 5:
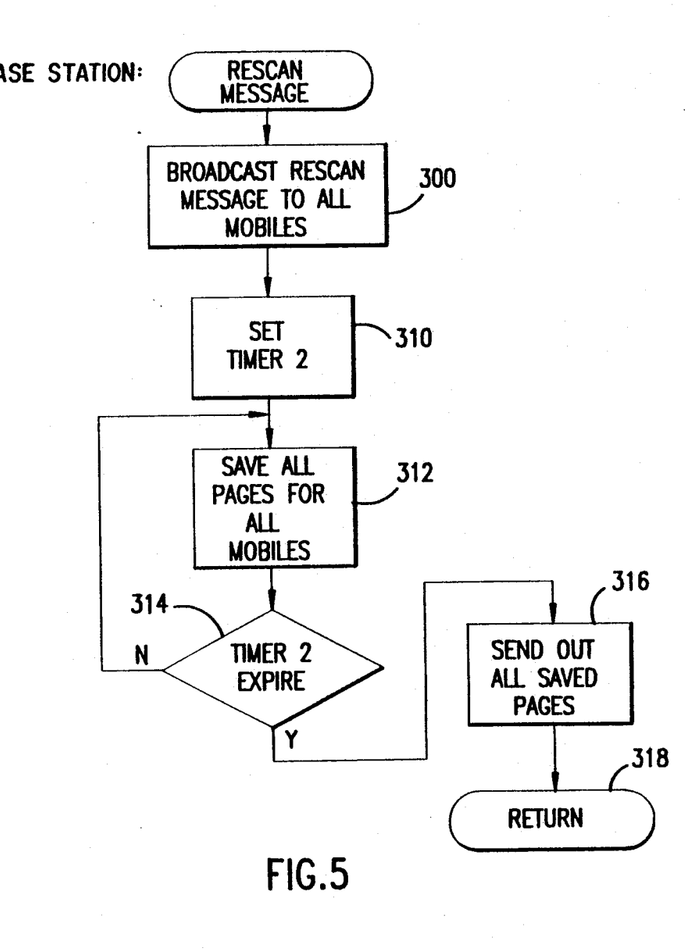
FIG. 5 is a flowchart illustrating the rescan order routine according to the present invention.

FIG. 5 is a flowchart which illustrates the rescan message routine which takes place at step 212 of the flowchart illustrated in FIG. 4. At step 300, a rescan message is broadcast on the control channel to all idle mobile stations. At step 310, a second timer, TIMER2 is initialized. This timer is used to keep track of how long it takes for the mobile stations receiving the rescan message to perform the rescanning of the paging channels. At step 312, all pages which are received by the base station for the mobile stations registered there are saved. This is necessary since the mobile stations cannot both be scanning the paging channels within their range and, at the same time, be listening to the paging channel to hear pages. The saving of the pages is controlled by the microprocessor controller 130'. The pages are saved until TIMER2 expires (step 314). When TIMER2 expires, the saved pages are broadcast (step 316) and control returns to the main routine (step 318).

Figure 6:
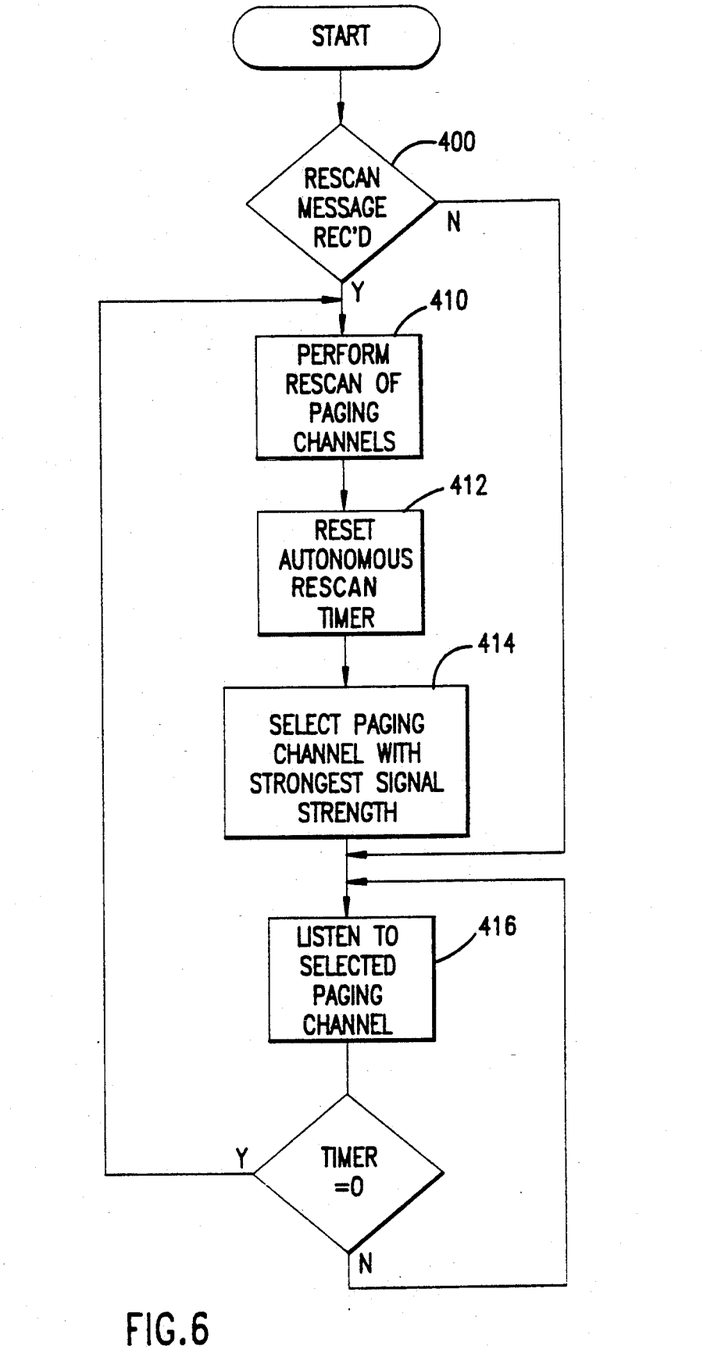
FIG. 6 is a flowchart illustrating the main routine performed by the mobile stations according to the present invention.

FIG. 6 is a flowchart illustrating the routine performed by the mobile stations in the system. At step 400, each mobile station receives the rescan message on the control channel to which it is locked. At step 410, the rescanning operation is performed. All paging channels assigned to the system are scanned. At step 412, the time which controls mobile-initiated autonomous rescan is reset. At step 414, the mobile station selects the paging channel with the strongest signal strength as the optimal paging channel. At step 416, the mobile station begins to listen to the selected, optimal paging channel.

As indicated above, the time for the mobile-initiated autonomous rescan is reset after the rescan ordered by the base station is performed. In this way, in the event that the mobile station moves from the receiving area of the base station at which it is registered and does not hear the rescan order from the base station, rescanning the paging channels will still take place in accordance with autonomous rescan operations.

If a mobile station is in use, i.e. involved in an active connection, when the rescan message is broadcast from the base station to the mobile stations, it will not be able to respond to the order to rescan. However, this does not present a problem since, according to applicable standards, a mobile station always scans the paging channels after call termination. Thus, assurance is obtained that the mobile is locked onto a channel having good signal quality.

In the embodiment of the invention that has been described, the command to send the rescan message is generated within the base station itself. However, in an alternative embodiment it is possible to originate the order to send the rescan messages in the mobile switching center, which order is transmitted to each base station.

From the foregoing description of the specific embodiments others can, by applying current knowledge, readily modify and/or adapt for various applications such specific embodiments without departing from the general nature of the invention, and, therefore, such adaptations and modifications should and are intended to be comprehended within the meaning and range of equivalents of the disclosed embodiments. It is to be understood that the phraseology of terminology employed herein is for the purpose of description and not of limitation.

What is claimed is:

1. A method for controlling the rescanning of paging channels by mobile stations in a cellular radio telephone system, wherein said mobile stations are operationally connected to at least one base station, said method comprising the step of periodically broadcasting a rescan message from said base station to said mobile stations at a predetermined interval during operation of said base station, which message instructs the mobile stations connected to said base station to initiate scanning of paging channels for the system.

2. The method as set forth in claim 1, further comprising, after the step of broadcasting, the step of queuing pages for said mobile stations for a period of time corresponding to the time required for the mobile stations to rescan the paging channels.

3. The method as set forth in claim 2, further comprising, after the step of queuing, broadcasting the queued pages.

4. The method of claim 1 wherein said predetermined interval is less than five minutes.

5. The method as set forth in claim 4, wherein said predetermined interval is about two minutes.

6. In a cellular mobile telephone communications system of the type in which mobile stations communicate with base stations over communication channels and autonomously rescan at least some of the communications channels of the system at a predetermined interval after a previous scan to locate channels having acceptable transmission quality, a method for controlling the scanning of the channels to minimize the incidents of calls which are lost during such scanning, comprising the step of periodically transmitting commands to rescan the channels from the base stations to the mobile stations at a rate in which the period between the transmissions of said commands is less than said predetermined interval.

7. The method as set forth in claim 6, wherein the predetermined interval is about five minutes.

8. The method as set forth in claim 6, wherein said period between transmissions is about two minutes.

9. The method as set forth in claim 6, further comprising the step of transmitting said command from a base station immediately preceding shut down of said base station.

10. The method as set forth in claim 6, wherein said system includes a plurality of base stations and said rate is different for different ones of base stations.

11. A method for use in a cellular radio telephone system for selecting an optimal paging channel for at least one mobile station, wherein said mobile station is operationally connected to at least one base station, said method comprising:

broadcasting channel rescan messages from said base station to said mobile station at predetermined intervals; and upon receipt of said messages in said mobile station, rescanning a plurality of paging channels and selecting a paging channel having the strongest signal strength.

12. The method as set forth in claim 11, further including the step of broadcasting a rescan message immediately preceding shut down of said base station.

13. The method as set forth in claim 11, wherein said system includes a plurality of base stations and said step of broadcasting comprises sending a rescan message at predetermined intervals which are respectively different for said base stations.

14. The method as set forth in claim 11, further comprising, after the step of broadcasting, the step of storing pages for said mobile station for a period of time corresponding to the time required to rescan the paging channels.

15. The method as set forth in claim 14, further comprising, after the step of storing, broadcasting the stored pages.

16. An apparatus for reducing incidents of lost calls and for improving quality of connections in a cellular mobile telephone system, said system comprising at least one base station and at least one mobile station, comprising:

means, provided in said base station, for broadcasting a rescan command, for rescanning a plurality of paging channels, at periodic intervals during operation of said base station;

means, provided in said mobile station, for receiving the rescan operation message and performing a rescan of the plurality of paging channels;

means, provided in said mobile station, for selecting an optimal paging channel in response to the rescan; and means provided in said mobile station, for monitoring messages on said optimal paging channel.

17. The apparatus of claim 16 further including means in said mobile station for autonomously initiating a rescanning operation in said mobile station a predetermined period of time after a previous rescanning of the paging channels by said mobile station.

18. The apparatus of claim 16 further including means in said base station for queuing pages to the mobile station immediately following broadcast of a rescan command.

* * * * *